United States Patent
Hinsz et al.

(10) Patent No.: US 8,027,947 B2
(45) Date of Patent: Sep. 27, 2011

(54) RAPIDLY MATURING EXPANDED DATA TRANSACTION PROFILES

(75) Inventors: Kyle Randolph Hinsz, San Diego, CA (US); Frank Wall Elliott, Jr., San Diego, CA (US); Joseph Philip Milana, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 887 days.

(21) Appl. No.: 11/871,812

(22) Filed: Oct. 12, 2007

(65) Prior Publication Data

US 2009/0125466 A1    May 14, 2009

(51) Int. Cl.
*G06F 9/44* (2006.01)
*G06N 7/02* (2006.01)
*G06N 7/06* (2006.01)

(52) U.S. Cl. .......................................................... 706/52
(58) Field of Classification Search ...................... 706/20
See application file for complete search history.

(56) References Cited

U.S. PATENT DOCUMENTS
2002/0099649 A1 * 7/2002 Lee et al. .......................... 705/38

OTHER PUBLICATIONS

Heckerman "A Tutorial on Learning With Bayesian Networks" MSR-TR-95-06, pp. 1-58.*

* cited by examiner

*Primary Examiner* — Jeffrey A Gaffin
*Assistant Examiner* — Li-Wu Chang
(74) *Attorney, Agent, or Firm* — Mintz, Levin, Cohn, Ferris, Glovsky and Popeo, P.C.

(57) ABSTRACT

A first set of variables is introduced into a data transaction scoring system. The first set of variables having a maturity level less than a second set of variables previously matured on the data transaction scoring system. The maturity level corresponding to an amount of exposure to the data transaction scoring system. The amount of exposure affecting a degree of precision for the data transaction scoring system. The first set of variables are introduced by expanding a data transaction profile for the data transaction scoring system including second set of variables to further include the first set of variables. Initial values are assigned for the first set of variables based on a statistical model. After such an assignment, scoring of data transactions using the expanded data transaction profile prior to maturing the data transaction system using the first set of variables can be initiated. Related apparatus, systems, techniques, and articles are also described.

23 Claims, 5 Drawing Sheets

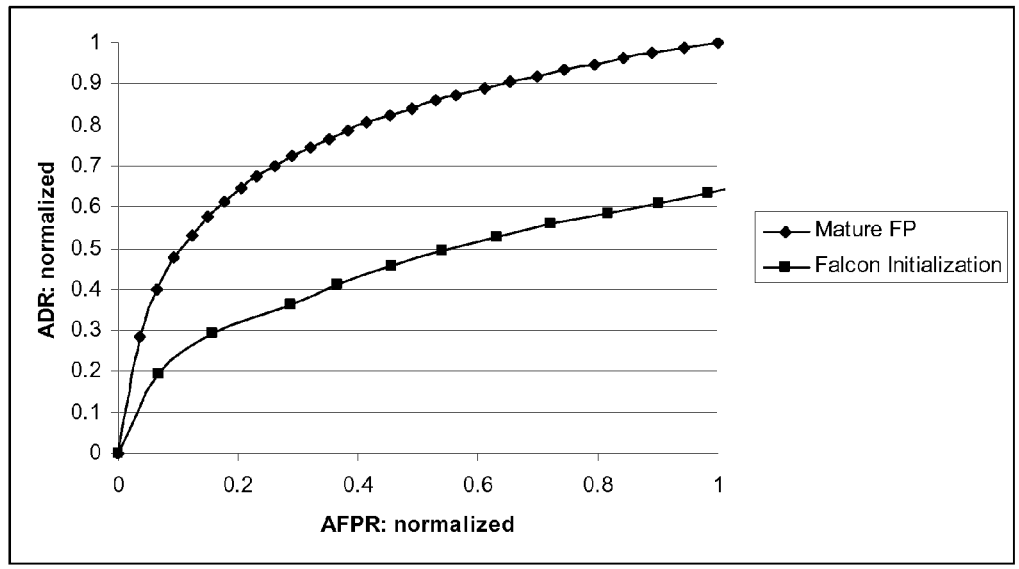
200A  FIG. 2A
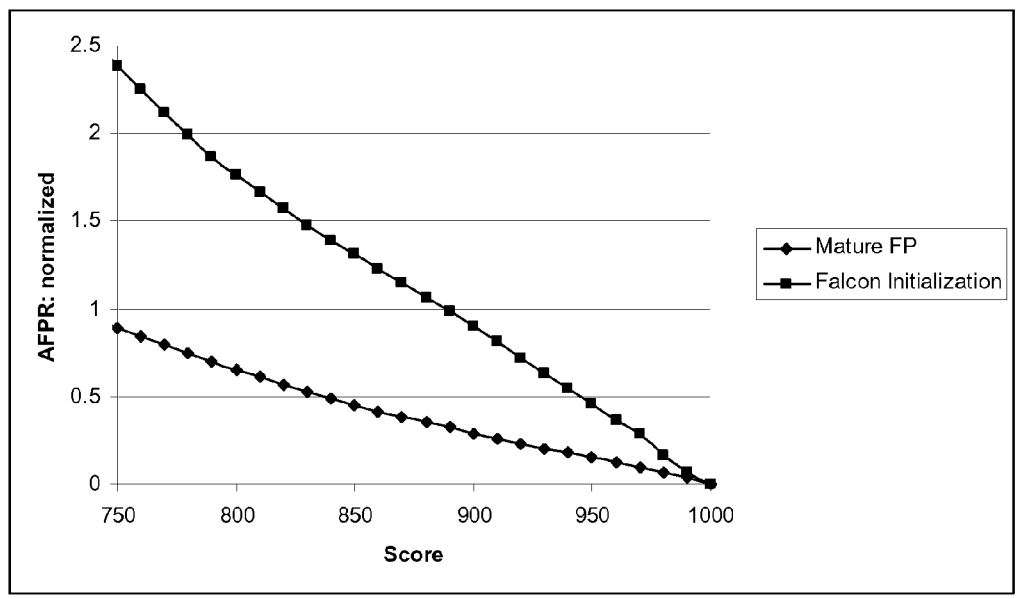
200B  FIG. 2B

RAPIDLY MATURING EXPANDED DATA TRANSACTION PROFILES

TECHNICAL FIELD

The subject matter described herein relates to techniques for adding new data transaction profile variables to a pre-existing model while minimizing operational impact.

BACKGROUND

The performance of data transaction scoring systems can often be improved by increasing the number of data feeds (i.e., data variables) that are provided to such systems. However, increasing the number of variables in a data scoring system can result in imprecise scores until there is a sufficient amount of exposure using such new variables. Depending on the size of data being characterized by the scoring system, the amount of time to conduct proper exposure using the new variables can be lengthy (which in turn can make such training costly). Moreover, unnecessary processing resources can be consumed while maturing the scoring system with the newly introduced variables.

SUMMARY

A first set of variables is introduced into a data transaction scoring system. The first set of variables having a maturity level less than a second set of variables previously matured on the data transaction scoring system. The maturity level corresponds to an amount of exposure to the data transaction scoring system. The amount of exposure affecting a degree of precision for the data transaction scoring system. The first set of variables are introduced by expanding a data transaction profile for the data transaction scoring system including second set of variables to further include the first set of variables. Initial values are assigned for the first set of variables based on a statistical model. After such an assignment, scoring of data transactions using the expanded data transaction profile prior to maturing the data transaction system using the first set of variables can be initiated.

In some variations, assigning can include determining a population mean for the second set of variables and assigning the initial values for the second set of variables based on the determined population mean. The population mean for each variable can be an average value of such variable across data used to train the data transaction system.

The variables can characterize a variety of indicators including, without limitation, merchant identification, IP address, e-mail account, shipping address, billing address, banking accounts out of which funds are extracted, banking accounts into which funds are deposited, and geographic location.

The data transaction scoring system can score payment card (e.g., credit card, debit card, etc.) transaction.

The data transaction scoring system can, in some variations, utilize a neural network backbone. In other variations, the data transaction scoring system can utilize a generalized linear model or a support vector machine.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. By allowing a model to be expanded without operational impact, run-up and maturing times can be avoided, thereby reducing costs and an amount of time to deploy an expanded model.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIGS. 2A-2B are charts illustrating performance curves after a first week of profile expansion comparing results of a fully matured profile with that produced when initializing all new variables to zero;

DETAILED DESCRIPTION

Figure 1:
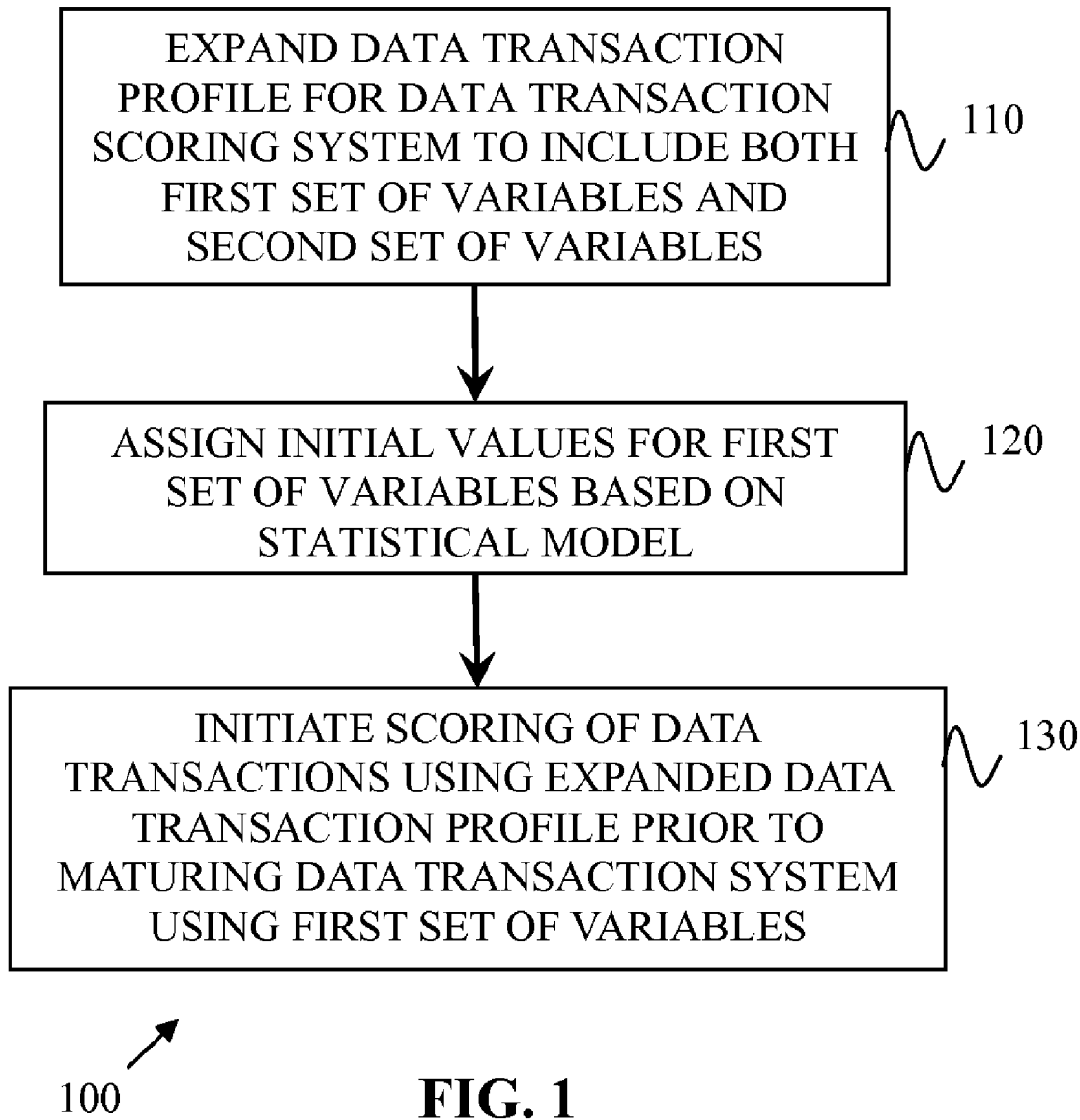
FIG. 1 is a process flow diagram illustrating a technique for expanding a data transaction profile.

With reference to FIG. 1, a process flow diagram illustrating a method 100 for introducing a first set of variables into a data transaction scoring system is illustrated. The first set of variables having a maturity level less than a second set of variables previously trained on the data transaction scoring system. The maturity level corresponds to the level of exposure to the data transaction scoring system. The level of exposure affecting a degree of precision for the data transaction scoring system. The first set of variables are introduced, at 110, by expanding a data transaction profile for the data transaction scoring system including second set of variables to further include the first set of variables. Initial values are assigned, at 120, for the first set of variables based on a statistical model. After such an assignment, at 130, scoring of data transactions using the expanded data transaction profile prior to maturing the data transaction system using the first set of variables can be initiated.

The variables can comprise any variety of indicators useful for scoring a data transaction including, for example, merchant identification, IP address, e-mail account, shipping address, billing address, banking accounts out of which funds are extracted, banking accounts into which funds are deposited, and geographic location. The type of variables can be customized for the type of data transaction (e.g., payment card transaction, etc.) being characterized or otherwise scored.

One technique for incrementally improving the predictive capability of an established data-transaction scoring product involves the addition of new data feeds. For transaction-based systems, the predictive value of the added data feeds can generally be captured in new profile variables that mathematically summarize the new information on entities that appear across individual records of the data feed. Realizing the incremental benefit of the improved statistical model in production can be problematic if the expanded profiles require a lengthy maturation stage, during which the performance of the new model is evolving to its asymptotic values. Perhaps even more critical is the operational impact of this evolution: if the "meaning" of the model's output is evolving, end-users may need to continuously modify their operating parameters: a tedious, often times confusing process fraught with error. The alternative to "inline" maturation is to evolve the expanded variables in parallel: a viable option but one that inherently delays the realization of the benefits of the improved model.

The following provides how expanded profiles can be rapidly matured using a statistical approximation of the value of each variable for each account in the case of the expansion required when expanding from a first model to a second model having more data variables (e.g., Fair Isaac Corporation FALCON product when upgrading to Fair Isaac Corporation FRAUD PREDICTOR (FP) product). Examples of fraud detection models are described, inter alia, in U.S. Pat. No. 5,819,226, Gopinathan et al., "Fraud Detection using Predictive Modeling", U.S. Pat. No. 6,330,546, Gopinathan et al., "Risk Determination and Management using Predictive Modeling and Transaction Profiles for Individual Transacting Entities", and U.S. patent application Ser. No. 11/677,517, Griegel et al., "Method and Apparatus for a Merchant Profile Builder.", the contents of all of which are fully incorporated by reference."

Figure 3A:
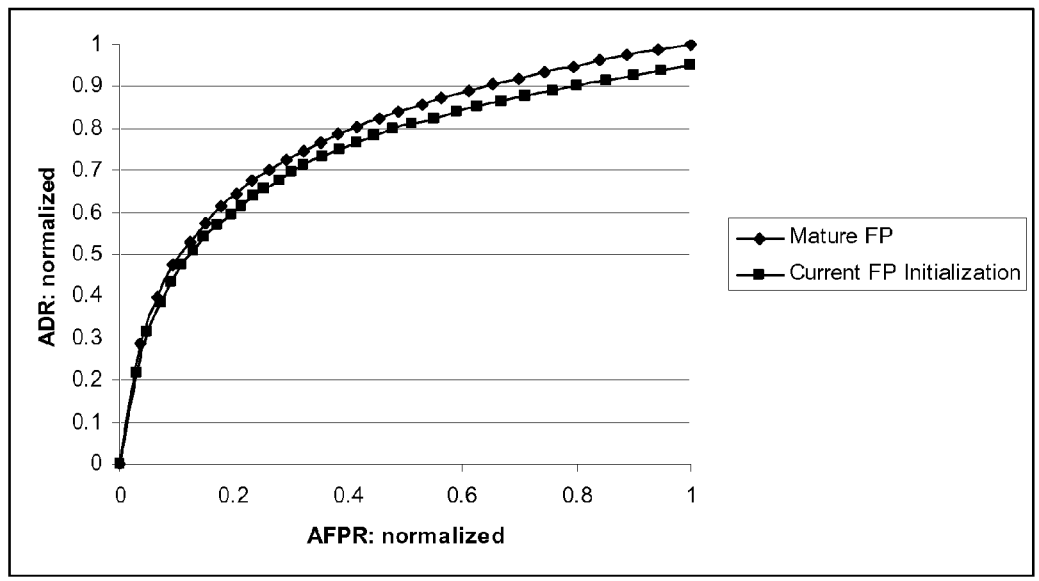
FIGS. 3A-3B are charts illustrating performance curves after a first week of profile expansion comparing results of a fully matured profile with that produced when all new variables set to their population mean.
Figure 3B:
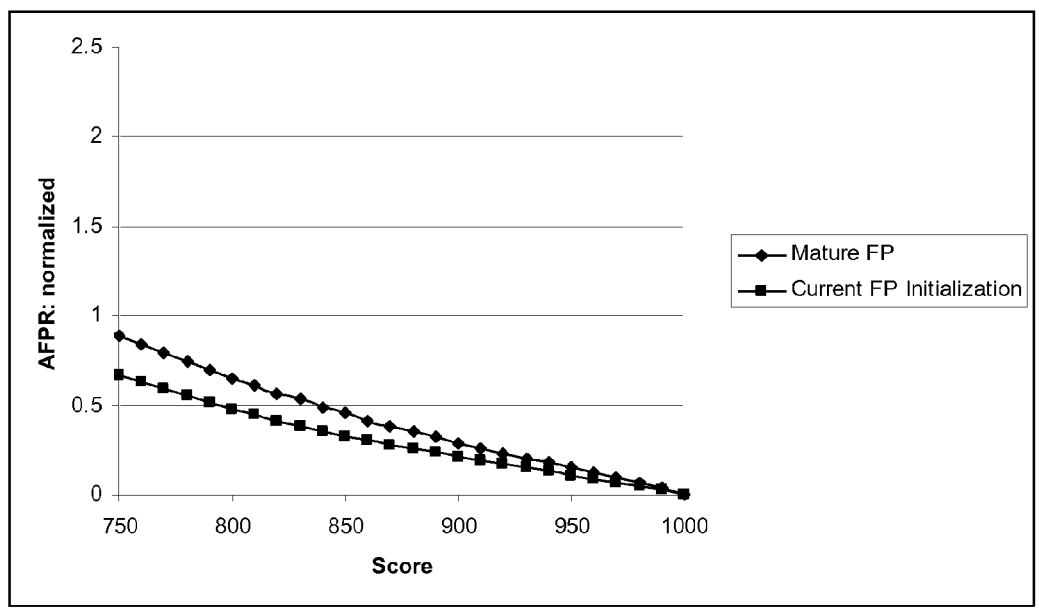

FP can add as a data feed to FALCON, Merchant profiles that reflect the fraud reporting associated with the Merchant involved in a payment card purchase. In FP, in addition to Merchant profiles, the FALCON cardholder profiles are also expanded by roughly 30% to capture details of the merchants the cardholder visits. These new cardholder variables can provide enhanced fraud detection capabilities of FP over FALCON. The expansion of the cardholder profile means that for existing FALCON clients that upgrade to FP, the cardholder profiles can have two sets of variables with radically different maturity. FIGS. 2A-2B are charts 200A, 200B that displays the impact of this discrepancy after the first week of upgrade. In this illustration, the new profile variables have been initialized to zero, following standard FALCON practice. FIGS. 3A-3B are charts 300A, 300B that compare model performance with a fully matured FP cardholder profile, wherein the entire profile has been matured simultaneously. To obtain robust statistics as well as to remove seasonality effects, the performance curves compile the results of 12 separate simulations differing by the month in which the FP upgrade is assumed to take place, and then examining the performance on the fraud cases having occurred in the historical data in the first week after the simulated upgrade date. The gaps between the curves in FIGS. 3A-3B are significant.

To ameliorate the impact indicated in FIGS. 2A-2B, rather than use predetermined FALCON initializations, each new profile variable can be set to its respective population mean. FIGS. 3A-3B display the performance curves of this scenario within the first week of switchover. While the Account Detection Rate (ADR) vs. Account False Positive Ratio (AFPR) curves have nearly been fully restored, the AFPR vs. score-distribution curves are still noticeably different, resulting in significant operational impact; as case-creation is triggered by rules base upon score-thresholds, the impact of FIGS. 3A-3B is that either clients are initially over-staffed during the FALCON to FP transition, or they need to regularly modify their score-creation thresholds as FP evolves to its mature performance state.

AFPR and ADR can be defined by:

$$AFPR(T) = \frac{(NF > T)}{(F > T)}$$

$$ADR(T) = \frac{(F > T)}{F}$$

Where

T: Operating or suspect threshold;

AFPR(T): Cumulative account false-positive rate, which is a function of the score threshold T;

ADR(T): Cumulative account detection rate, which is a function of the score threshold T;

(NF>T): Number of non-fraud accounts scored above T, which is a function of the score threshold T;

(F>T): Number of fraud accounts scored above T, which is a function of the score threshold T; and F: Number of true (actual) fraud accounts.

Figure 4A:
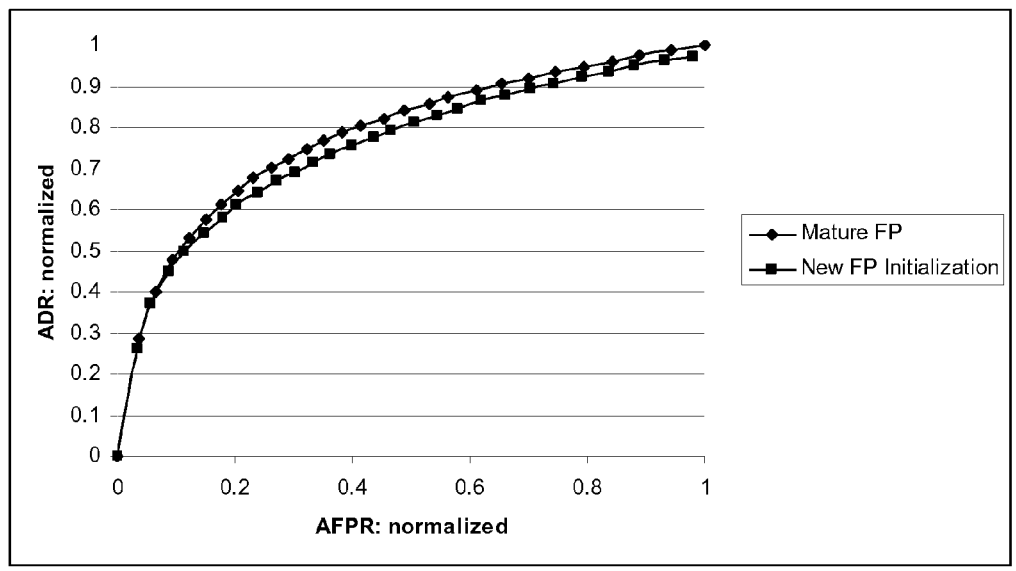
FIGS. 4A-4B are charts illustrating performance curves after a first week of profile expansion comparing results of a fully matured profile with that produced from new maturation scheme wherein new variables are also assigned same maturation as the variables in matured profile.
Figure 4B:
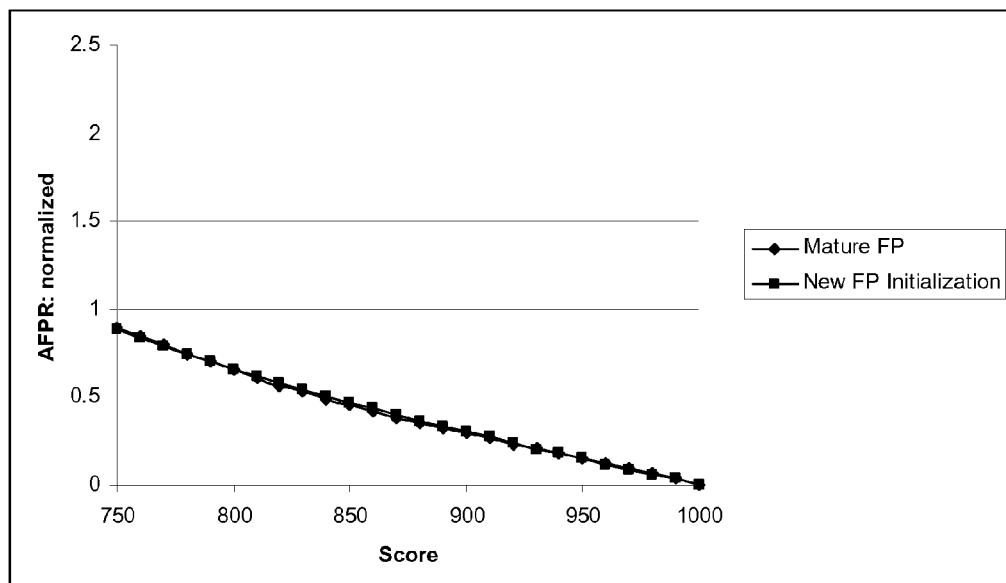

Attempts to predict, using Linear as well as Quantile regression, the value of each new profile variable on each account using the FALCON profile variables as input to the predictive model was pursued. In these explorations a choice had to be made as to how to prescribe the maturity of the initialized variables. This is relevant with some data transaction scoring systems as profile filters that update the profile variables with each new transaction can contain Time and Event based parameters that explicitly depend upon the age of the profile variables. The value of these parameters thus became one of the factors to vary in the simulations. The outcome of these trials were that the model performance curves were consistently much nearer their fully matured state when the newly created and initialized FP variables are assigned the same maturation parameters as that of the FALCON profile. Indeed, this change was all that was required to convert the results of FIGS. 3A-3B into FIGS. 4A-4B. The advantages of this last approach, as well as the diminishing possible returns of possible improvement as is evident in the curves, abrogated the need of pursuing a more sophisticated and commensurately more complicated solution (both to develop as well as to implement). In short, the accuracy of the statistical estimate of the expanded variable required the self-consistency that these estimates are indeed, as intended, values for matured profiles and should thus be subsequently aged accordingly.

Figure 5:
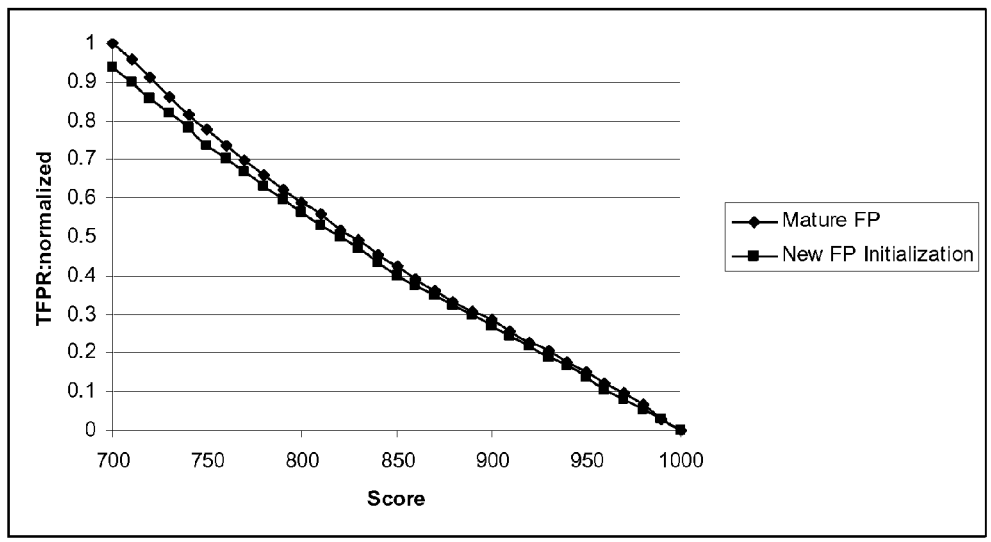
FIG. 5 is a chart illustrating performance curves comparing a fully matured profile with that produced when all new variables set to their population mean for "high-dollar" transactions (amounts $\geq$ \$200)
Figure 6:
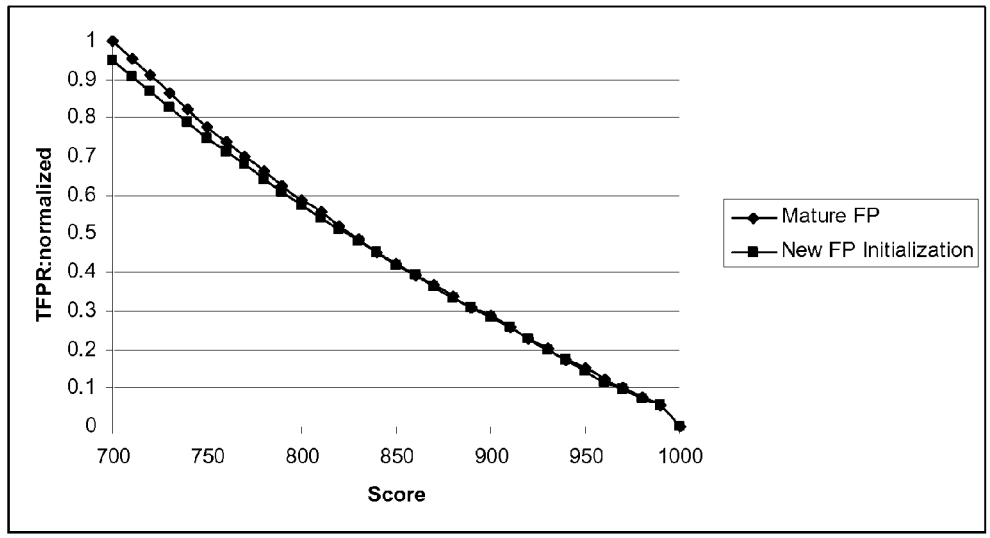
FIG. 6 is a chart illustrating performance curves comparing transaction metrics for a fully matured profile with that produced when all new variables set to their population mean across all transactions.

To further test the acceptability of this new maturation scheme, the performance on "high-dollar" transactions alone was also tested: FIG. 5 provides these results where now Transition metrics are more appropriate (by showing Transaction False Positive Ratio (TFPR) in relation to Score). Transaction metrics across all transactions are provided in FIG. 6. All performance curves are sterling: using a statistically founded approximation for the expanded profiles, the new model is performing effectively immediately at fully matured levels across all metrics.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flows depicted in the accompanying figures and described herein do not require the particular order shown, or sequential order, to achieve desirable results. Other embodiments may be within the scope of the following claims.

What is claimed is:

1. An article for introducing a first set of variables into a data transaction scoring system, the first set of variables having a maturity level less than a second set of variables previously matured on the data transaction scoring system, the maturity level corresponding to an amount of exposure to the data transaction scoring system, the amount of exposure affecting a degree of precision for the data transaction scoring system, the first set of variables being generated using a first model and the second set of variables being generated using a second model different than the first model, the article comprising a non-transitory machine-readable medium embodying instructions that when performed by one or more machines result in operations comprising:

expanding a data transaction profile for the data transaction scoring system including the second set of variables, the expanding causing the expanded data transaction profile to further include the first set of variables, the first set of variables comprising merchant-specific variables corresponding to a merchant of a data transaction between the merchant and a customer, the second set of variables comprising customer-specific variables corresponding to the customer;

assigning initial values for the first set of variables based on a statistical model, the initial values approximating a higher maturity level for the first set of variables, the assigning comprising determining a population mean for the second set of variables and assigning the initial values for the second set of variables based on the determined population mean; and initiating scoring, by the data transaction scoring system, of the data transaction using the expanded data transaction profile prior to maturing the data transaction system using the first set of variables.

2. An article as in claim 1, wherein the population mean for each variable is an average value of such variable across data used to train the data transaction system.

3. An article as in claim 1, wherein the variables characterize one or more indicators selected from a group comprising: merchant identification, IP address, e-mail account, shipping address, billing address, banking accounts out of which funds are extracted, banking accounts into which funds are deposited, and geographic location.

4. An article as in claim 1, wherein the data transaction scoring system scores payment card transactions.

5. An article as in claim 1, wherein the data transaction scoring system utilizes a neural network.

6. An article as in claim 1 wherein the data transaction scoring system utilizes a generalized linear model.

7. An article as in claim 1, wherein the data transaction scoring system utilizes a support vector machine.

8. An article as in claim 1, further comprising instructions that when performed by one or more machines result in operations comprising:

assigning one or more maturity parameters for the first set of variables to be substantially equal to maturity parameters for the second set of variables.

9. A method for introducing a first set of variables into a data transaction scoring system, the first set of variables having a maturity level less than a second set of variables previously matured on the data transaction scoring system, the maturity level corresponding to an amount of exposure of the data transaction scoring system, the amount of exposure affecting a degree of precision for the data transaction scoring system, the method being implemented by one or more data processors and comprising:

expanding, by at least one data processor, a data transaction profile for the data transaction scoring system including the second set of variables, the expanding causing the expanded data transaction profile to further include the first set of variables, the first set of variables comprising merchant-specific variables corresponding to a merchant of a data transaction between the merchant and a customer, the second set of variables comprising customer-specific variables corresponding to the customer;

assigning, by at least one data processor, initial values for the first set of variables based on a statistical model, the assigning comprising determining a population mean for the second set of variables and assigning the initial values for the second set of variables based on the determined population mean; and initiating, by at least one data processor, scoring, by the data transaction processing system, of the data transaction using the expanded data transaction profile prior to maturing the data transaction system using the first set of variables.

10. A method as in claim 9, wherein the population mean for each variable is an average value of such variable across data used to train the data transaction system.

11. A method as in claim 9, wherein the variables characterize one or more indicators selected from a group comprising: merchant identification, IP address, e-mail account, shipping address, billing address, banking accounts out of which funds are extracted, banking accounts into which funds are deposited, and geographic location.

12. A method as in claim 9, wherein the data transaction scoring system scores payment card transactions.

13. A method as in claim 9, wherein the data transaction scoring system utilizes a neural network.

14. A method as in claim 9, wherein the data transaction scoring system utilizes a generalized linear model.

15. A method as in claim 9, wherein the data transaction scoring system utilizes a support vector machine.

16. A method as in claim 9 further comprising:

assigning, by at least one data processor, one or more maturity parameters for the first set of variables to be substantially equal to maturity parameters for the second set of variables.

17. An article for introducing a first set of variables into a data transaction scoring system, the first set of variables having a maturity level less than a second set of variables previously matured on the data transaction scoring system, the maturity level corresponding to an amount of exposure to the data transaction scoring system, the amount of exposure affecting a degree of precision for the data transaction scoring system, the article comprising a non-transitory machine-readable medium embodying instructions that when performed by one or more machines result in operations comprising:

expanding a data transaction profile for the data transaction scoring system including the second set of variables, the expanding causing the expanded data transaction profile to further include the first set of variables, the first set of variables comprising merchant-specific variables corresponding to a merchant of a data transaction between the merchant and a customer, the second set of variables comprising customer-specific variables corresponding to the customer;

assigning initial values for the first set of variables based on a population mean; and initiating scoring, by the data processing system, of the data transaction using the expanded data transaction profile prior to training the data transaction system using the first set of variables.

18. An article as in claim 17, wherein the population mean for each variable is an average value of such variable across data used to train the data transaction system.

19. An article as in claim 17, wherein the variables characterize one or more indicators selected from a group comprising: merchant identification, IP address, e-mail account, shipping address, billing address, banking accounts out of which funds are extracted, banking accounts into which funds are deposited, and geographic location.

20. An article as in claim 17, wherein the data transaction scoring system scores payment card transactions.

21. An article as in claim 17, wherein the data transaction scoring system utilizes a neural network.

22. An article as in claim 17, wherein the data transaction scoring system utilizes a generalized linear model or a support vector machine.

23. An article as in claim 17, further comprising instructions that when performed by one or more machines result in operations comprising:

assigning one or more maturity parameters for the first set of variables to be substantially equal to maturity parameters for the second set of variables.

* * * * *